US007274970B2

(12) United States Patent
Schuchard

(10) Patent No.: US 7,274,970 B2
(45) Date of Patent: Sep. 25, 2007

(54) DEVICE FOR AIDING STACKING AND UNSTACKING FOR A STACKER TRUCK

(75) Inventor: Michael Schuchard, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 59 days.

(21) Appl. No.: 11/144,439

(22) Filed: Jun. 3, 2005

(65) Prior Publication Data

US 2005/0281657 A1 Dec. 22, 2005

(30) Foreign Application Priority Data

Jun. 4, 2004 (DE) ...................... 10 2004 027 446

(51) Int. Cl.
*G06F 7/00* (2006.01)

(52) U.S. Cl. ....................... 700/213; 700/259; 187/224

(58) Field of Classification Search ................ 700/213, 700/214, 218, 259; 187/222, 224, 227; 414/592, 414/619, 660–667
See application file for complete search history.

(56) References Cited

U.S. PATENT DOCUMENTS

| | | | | |
|---|---|---|---|---|
| 4,279,328 | A * | 7/1981 | Ahlbom | 187/224 |
| 5,208,753 | A * | 5/1993 | Acuff | 701/50 |
| 5,938,710 | A * | 8/1999 | Lanza et al. | 701/50 |
| 6,669,089 | B2 * | 12/2003 | Cybulski et al. | 235/385 |
| 6,825,766 | B2 * | 11/2004 | Hewitt et al. | 340/572.7 |
| 7,010,404 | B2 * | 3/2006 | Ichijo et al. | 701/50 |
| 2004/0073359 | A1 * | 4/2004 | Ichijo et al. | 701/201 |
| 2004/0083025 | A1 * | 4/2004 | Yamanouchi et al. | 700/213 |
| 2004/0098146 | A1 * | 5/2004 | Katae et al. | 700/50 |

FOREIGN PATENT DOCUMENTS

EP 1 408 001 4/2004

* cited by examiner

*Primary Examiner*—Khoi H. Tran
(74) *Attorney, Agent, or Firm*—Vidas, Arrett, Steinkrau

(57) ABSTRACT

Device for aiding stacking and unstacking for a stacker truck, with the following features: a height measuring device which measures the height of a forklift of the stacker truck, a video camera which is associated with the forklift, a control device for the actuation of the forklift to which the signals of the height measuring device and the video camera are transmitted and which contains a fork elevation height pre-selection menu and a video menu, a screen connected to the control device for the operator of the stacker truck, a pre-selection unit connected to the control device for pre-selecting the fork elevation height of the forklift, whereby the control device automatically drives the forklift via the fork elevation height pre-selection menu to the pre-selected height and produces a display on the screen, the control device switching to the video menu and switching the signal of the video camera to the screen, when the forklift enters a region close to the pre-set height of the forklift.

7 Claims, 1 Drawing Sheet

DEVICE FOR AIDING STACKING AND UNSTACKING FOR A STACKER TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Loads can be lifted and stacked and unstacked to very great heights by means of a reach-type forklift truck. So that the operator can rapidly and safely stack a pallet in a rack or unstack it therefrom, it is known to associate a video camera with the tines of the forklift. The driver can identify on the screen in the cab whether the height, the lateral position or the inclination of the forklift has to be altered.

With such vehicles, it is furthermore known to pre-select the fork elevation height. When the operator knows from the outset the height to which the load has to be lifted, said height can be entered as a pre-selected fork elevation height and the fork elevation height measured by a fork elevation height measuring device is compared with the pre-set height in a control device. In this manner, the forklift can be automatically moved into the desired position before the definitive stacking or unstacking. In this connection, it has furthermore been known to make the fork elevation height pre-selection menu visible on a visualisation means. Finally, it is known to provide both a fork elevation height pre-selection menu and a video menu. A disadvantage therewith is that the view of the operator continually has to be refocused, depending on which visualisation means is watched, as both are activated during operation.

A total of six different operating modes are disclosed in EP 1 408 001 A1 for a stacking aid or automatic stacking for an industrial truck. Display means are provided to display the position of a load carrying means on, for example, a screen, the position being detected by an appropriate detector. A further detector can, for example, determine whether a load is present on the load carrying means. Automatic stacking can take place in a specific operating mode. Furthermore, in a further mode, the position of the load carrying means can be detected, in order, for example, to effect automatic lifting or lowering, in order to pick up a load.

The object of the invention is to produce a device for aiding stacking and unstacking for a stacker truck which is reduced in cost relative to known devices and is simpler to handle.

BRIEF SUMMARY OF THE INVENTION

As in the known cases, the device according to the invention contains a height measuring device and a video camera associated with the forklift.

According to the invention, however, only one screen is provided on which both the video menu and the height pre-selection menu are displayed. To this end, the control device switches from the fork elevation height pre-selection menu to the video menu and vice versa, depending on at which height the forklift is positioned relative to a pre-selected height. If, by means of the pre-selection menu, the pre-selected fork elevation height is automatically selected and the forklift approaches the pre-set height value to a specific degree, said pre-selection menu is automatically switched to the video menu. The operator can now precisely position the forklift for the desired stacking or unstacking by watching the video on the screen. According to an embodiment of the invention, if the forklift moves out of the region close to the pre-selected height, an automatic switch to the fork elevation height pre-selection menu can take place.

With the device according to the invention, only one visualisation means is provided in the form of a screen which only displays a video image when it is actually provided.

A saving is made by means of the invention, in so far as only one visualisation means is required. Moreover, it is simplified for the operator as the view of the operator only has to be focused on one screen.

It is possible to superimpose a video image on a screen of a further display, for example the fork elevation height display. According to the invention, therefore, it is not necessary to provide the display of the fork elevation height and the video image alternately but the two displays can be provided simultaneously in the region close to the set fork elevation height.

According to a further embodiment of the invention, it is provided that manually actuatable means are connected to the control device for the selection of the fork elevation height pre-selection menu or video menu. If the operator wishes, the automatic operation according to the invention can therefore be overridden at will.

A further embodiment of the invention provides that the control device also contains a drive mode menu which is displayed on the screen. This measure is also to be regarded as the prior art. According to the invention, the stacker truck comprises a speed measuring device whose signal is transmitted to the control device and the control device automatically switches the drive mode menu to the screen when the speed of the stacker truck exceeds a pre-set value. Speed measuring devices in stacker trucks form the prior art. The peculiarity in the present case is that during normal drive mode, when in any case stacking or unstacking functions do not take place, the drive mode menu is automatically present.

An embodiment of the invention is to be described hereinafter in more detail with reference to a drawing.

BRIEF DESCRIPTION OF THE SEVERAL VIEWS OF THE DRAWINGS

A detailed description of the invention is hereafter described with specific reference being made to the drawings.

DETAILED DESCRIPTION OF THE INVENTION

Figure 1:
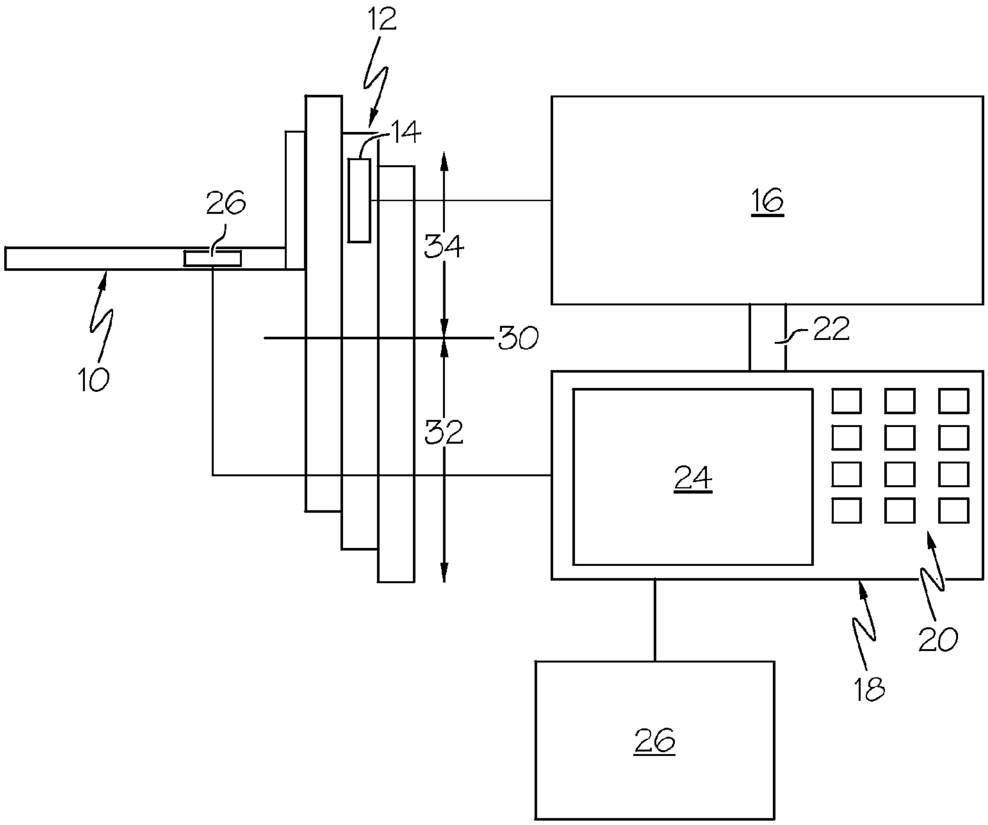
FIG. 1 shows diagrammatically a device according to the invention.

While this invention may be embodied in many different forms, there are described in detail herein a specific preferred embodiment of the invention. This description is an exemplification of the principles of the invention and is not intended to limit the invention to the particular embodiment illustrated FIG. 1 shows diagrammatically a device according to the invention.

Indicated by 10 in the Figure is a forklift of a stacker truck, not shown further, which may be operated at heights along a mast 12 consisting of three mast elements. By appropriate means the forklift 10 can also be operated laterally (side shift) and its inclination altered. Neither of these is shown. A sensor 14 is associated with the mast 12 whose output signals are transmitted to a height measuring device 16. Thus the height of the forklift 10 can be detected.

Figure 2:
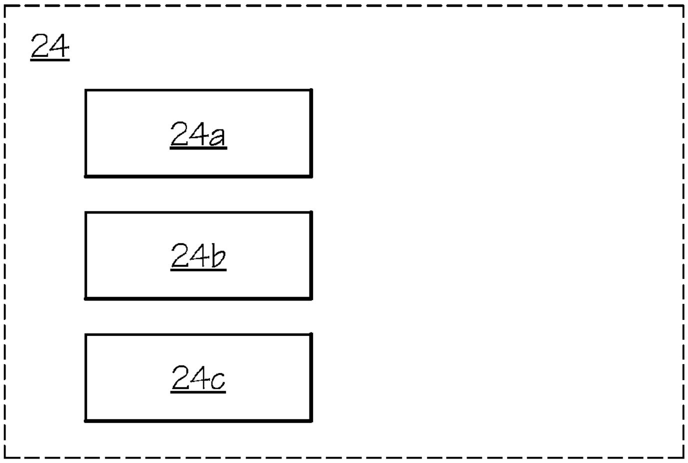
FIG. 2 shows the screen of the device.

A control device is contained in a block 18 for the control of the forklift 10 in a manner known per se. The block 18 contains a row of enter keys 20 (manually actuatable means) for different menus to be selected and other functions of the stacker truck not shown. Thus, for example, the fork elevation height of the forklift 10 may be pre-selected when the corresponding menu key is pressed. If the fork elevation height is reached, it can be determined via the sensor 14 and height measuring device 16 and can be transmitted to the control device via a CAN-Bus 22, which completes the elevation of the forklift 10 when the fork elevation height is reached. As shown in FIG. 2, the fork elevation height pre-selection menu (24*a*) or the respective fork elevation height (24*b*) is displayed on a screen 24. To simplify the figures, the screen in FIG. 2 is shown with multiple displays 24*a-c* however, as discussed below, the screen 24 can have just one display or two superimposed displays.

A video camera 26 is associated with a tine of the forklift 10 which is also connected to the control device. When actuating a corresponding key of the keyboard 20 a video menu is selected and the recorded immediate vicinity of the video camera of the forklift 10 is displayed on the screen 24. By means of the on-screen display, therefore, it is possible for the operator of the stacker truck to carry out precise positioning of the forklift 10 with regard to the height, lateral position and inclination.

With the device shown, the control device is configured such that the fork elevation height pre-selection menu (24*a*) is normally switched on during the lifting and lowering mode or can also be switched on at will. If the forklift 10 approaches a region close to the pre-set fork elevation height, it is automatically switched in the control device to the video menu and the video image appears on the screen 24. It is understood that it is also possible to superimpose the two displays of the two menus. It is crucial in the present case that the video menu is active substantially only in the region of the pre-set fork elevation height, so that the operator does not have to concentrate on different displays adjacent to one another.

With the known stacker trucks it is also usual to provide a drive mode menu (24*c*) and to produce corresponding displays on the screen 24. If the stacker truck is in drive mode, which normally does not coincide with the stacking operation, it can automatically be switched to the drive mode menu (24*c*) and a corresponding display can be produced on the screen 24, when the stacker truck has reached a pre-set speed. Generally, the stacker truck is provided with a speed measurer (26) whose signals are also transmitted to the control device in the block 18, as shown in FIG. 1.

Alternatively, a detector can detect whether lifting apparatus is in free lift mode (32) or in mast lift mode (34). As shown in FIG. 1, when the forklift (10) is below a threshold height, indicated by line 30, the forklift (10) is in free lift mode (32) and when the forklift (10) is above the threshold height, indicated by line 30, the forklift (10) is in mast lift mode (34). In free lift mode (32) the 'drive mode menu' (24*c*) is displayed and in mast lift mode (34) it is automatically switched to the video image.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A device for aiding, stacking and unstacking for a lift truck, with the following features: a height measuring device (16) for measuring the height of a fork (10) of the fork lift a control device for the actuation of the forklift to which the signals of the height measuring device (16) and a video camera (26) are transmitted, the control device including a fork elevation height pre-selection menu and a video menu, a single screen (24) connected to the control device for the operator of the lift truck, a pre-selection unit connected to the control device for pre-selecting the fork elevation height of the fork, the height preselection menu and the video menu being shown commonly or selectively on the screen, the video menu allowing an operator to position by visualization the fork for the desired stacking and unstacking, the control device automatically driving the fork via the fork elevation height preselection menu to the preselected height and producing a display on the screen (24) to indicate the preselected and the actual height of the fork, the control device being designed to switch to the video menu and switching the signal of the video camera (26) to the screen (24), when the fork enters a range close to the pre-set height of the fork.

2. Device according to claim 1, characterised in that after switching to the video image in the control device, the screen (24) exclusively shows the video image.

3. Device according to claim 1, characterised in that after the control device switches to the video image, at least the fork elevation height is simultaneously also displayed.

4. Device according to claim 1, characterised in that the control device switches back to the fork elevation height pre-selection menu when the forklift (10) moves out of the pre-set region close to the pre-selected height.

5. Device according to claim 1, characterised in that manually actuatable means are connected to the control device for the selection of the fork elevation height pre-selection menu or video menu.

6. Device according to claim 1, characterised in that the control device also contains a drive mode menu which is displayed on the screen (24), the stacker truck comprises a speed measuring device whose signal is transmitted to the control device and the control device automatically displays the drive mode menu on the screen (24) when the speed of the stacker truck reaches a pre-set value.

7. Device according to claim 1, characterised in that the control device contains a drive mode menu which is displayed on the screen (24), a sensor is provided which detects whether the lifting apparatus is in the free lift mode or the mast lift mode, the drive mode menu in the free lift mode being switched to the signal of the video camera in the mast lift mode.

* * * * *